United States Patent
Davidson (10) Patent No.: US 11,641,044 B1
(45) Date of Patent: May 2, 2023

(54) BATTERY HOUSING AND SYSTEMS AND METHODS OF MAKING THEREOF

(71) Applicant: Energizer Brands, LLC, St. Louis, MO (US)

(72) Inventor: Gregory James Davidson, Oregon, WI (US)

(73) Assignee: Energizer Brands, LLC, St. Louis, MO (US)

( * ) Notice: Subject to any disclaimer, the term of this patent is extended or adjusted under 35 U.S.C. 154(b) by 85 days.

(21) Appl. No.: 17/223,134

(22) Filed: Apr. 6, 2021

Related U.S. Application Data (60) Provisional application No. 63/009,562, filed on Apr. 14, 2020.

(51) Int. Cl.
| | |
|---|---|
| *H01M 50/367* | (2021.01) |
| *H01M 50/131* | (2021.01) |
| *H01M 50/109* | (2021.01) |
| *H01M 50/16* | (2021.01) |
| *H01M 50/184* | (2021.01) |

(52) U.S. Cl.
CPC ....... *H01M 50/367* (2021.01); *H01M 50/109* (2021.01); *H01M 50/131* (2021.01); *H01M 50/16* (2021.01); *H01M 50/184* (2021.01)

(58) Field of Classification Search
CPC ............. H01M 50/367; H01M 50/109; H01M 50/131; H01M 50/16; H01M 50/184
See application file for complete search history.

(56) References Cited

U.S. PATENT DOCUMENTS

| | | | |
|---|---|---|---|
| 4,343,869 | A | 8/1982 | Oltman et al. |
| 4,369,568 | A | 1/1983 | Dopp |
| 5,306,582 | A | 4/1994 | Tanaka |
| 5,451,473 | A | 9/1995 | Oltman et al. |
| 5,567,539 | A | 10/1996 | Takahashi et al. |
| 5,766,791 | A | 6/1998 | Takahashi et al. |
| 5,958,617 | A | 9/1999 | Kozuki et al. |
| 6,436,156 | B1 | 8/2002 | Wandeloski et al. |
| 6,451,478 | B1 | 9/2002 | Okahisa et al. |
| 6,468,691 | B1 | 10/2002 | Malay et al. |
| 6,521,373 | B1 | 2/2003 | Suzuki et al. |
| 6,521,379 | B2 | 2/2003 | Nishida et al. |
| 6,537,693 | B1 | 3/2003 | Suzuki et al. |
| 6,602,629 | B1 | 8/2003 | Guo et al. |
| 6,610,353 | B1 | 8/2003 | Gibbons et al. |

(Continued)

FOREIGN PATENT DOCUMENTS

| | | |
|---|---|---|
| EP | 2 538 484 B1 | 12/2012 |
| WO | WO-2016/202556 A1 | 12/2016 |

*Primary Examiner* — Milton I Cano
*Assistant Examiner* — Joshua P McClure
(74) *Attorney, Agent, or Firm* — Foley & Lardner LLP (57) ABSTRACT

A housing for a button cell battery includes a top, a can and a grommet. The skirt of the can extends between a top panel and a free end, and includes a substantially vertical first section and an outwardly tapered second section. The first section extends from the top panel of the can. The second section extends from the first section. Upon assembly of the housing, a flow path is defined between an outer surface of the skirt of the grommet and the inner surface of the skirt of the can. The flow path allows air to escape during the assembly, thus minimizing the risk of gas being entrapped within the interior of the housing of the finished cell battery.

8 Claims, 10 Drawing Sheets

(56) References Cited

U.S. PATENT DOCUMENTS

| | | |
|---|---|---|
| 6,716,552 B2 | 4/2004 | Zhang et al. |
| 7,001,439 B2 | 2/2006 | Buckle |
| 7,001,689 B2 | 2/2006 | Buckle |
| 7,223,496 B2 | 5/2007 | Takahashi et al. |
| 7,452,627 B2 | 11/2008 | Lee |
| 7,455,882 B2 | 11/2008 | Gibbons et al. |
| 7,470,482 B2 | 12/2008 | Takamura et al. |
| 7,709,141 B2 | 5/2010 | Kim et al. |
| 7,816,026 B2 | 10/2010 | Janmey |
| 7,842,414 B2 | 11/2010 | Hong et al. |
| 7,960,048 B2 | 6/2011 | Jang et al. |
| 7,993,778 B2 | 8/2011 | Yim et al. |
| 8,048,559 B2 | 11/2011 | Kim |
| 8,062,787 B2 | 11/2011 | Kim |
| 8,173,296 B2 | 5/2012 | Lee |
| 8,288,036 B2 | 10/2012 | Kim |
| 8,298,704 B2 | 10/2012 | Matsuhisa et al. |
| 8,394,533 B2 | 3/2013 | Bak |
| 8,399,125 B2 | 3/2013 | Kim |
| 8,409,736 B2 | 4/2013 | Wang et al. |
| 8,455,124 B2 | 6/2013 | Kim |
| 8,541,132 B2 | 9/2013 | Kim |
| 8,546,007 B2 | 10/2013 | Lee et al. |
| 8,673,485 B2 | 3/2014 | Yamazaki et al. |
| 8,679,672 B2 | 3/2014 | Yamaguchi et al. |
| 8,815,437 B2 | 8/2014 | Lee |
| 8,865,344 B2 | 10/2014 | Kim et al. |
| 8,940,435 B2 | 1/2015 | Kim et al. |
| 8,945,242 B2 | 2/2015 | Mineya et al. |
| 8,993,148 B2 | 3/2015 | Wang et al. |
| 9,005,802 B2 | 4/2015 | Humphrys et al. |
| 9,034,512 B2 | 5/2015 | Sato et al. |
| 9,083,053 B2 | 7/2015 | Humphrys |
| 9,178,188 B2 | 11/2015 | Lim |
| 9,178,190 B2 | 11/2015 | Kim et al. |
| 9,178,251 B2 | 11/2015 | Gaugler |
| 9,350,004 B2 | 5/2016 | Kim |
| 9,502,698 B2 | 11/2016 | Takahashi et al. |
| 9,515,301 B2 | 12/2016 | Hattori |
| 9,564,654 B2 | 2/2017 | Wang et al. |
| 9,614,247 B2 | 4/2017 | Ensling et al. |
| 9,748,550 B2 | 8/2017 | Kim |
| 9,755,203 B2 | 9/2017 | Kim et al. |
| 9,793,572 B2 | 10/2017 | Lee et al. |
| 10,128,477 B2 | 11/2018 | Lee et al. |
| 10,164,306 B2 | 12/2018 | Allen et al. |
| 10,193,125 B2 | 1/2019 | Doo et al. |
| 10,283,750 B2 | 5/2019 | Lee et al. |
| 10,418,620 B2 | 9/2019 | Lee et al. |
| 2003/0013014 A1 | 1/2003 | Ashihara et al. |
| 2003/0104275 A1 | 6/2003 | Ishida et al. |
| 2004/0197645 A1 | 10/2004 | Buckue |
| 2006/0183020 A1* | 8/2006 | Davidson ............ H01M 50/198 429/165 |
| 2007/0054168 A1 | 3/2007 | Chang et al. |
| 2007/0224495 A1* | 9/2007 | Gibbons ............ H01M 50/414 429/510 |
| 2007/0224500 A1 | 9/2007 | White et al. |
| 2008/0206628 A1 | 8/2008 | Honbou |
| 2008/0254354 A1 | 10/2008 | Adams |
| 2009/0098445 A1 | 4/2009 | Kim |
| 2010/0291422 A1 | 11/2010 | Deng et al. |
| 2011/0250488 A1 | 10/2011 | Park |
| 2012/0321960 A1 | 12/2012 | Kim et al. |
| 2013/0230749 A1 | 9/2013 | Kim et al. |
| 2014/0045009 A1 | 2/2014 | Kim |
| 2014/0147716 A1 | 5/2014 | Oh et al. |
| 2014/0220394 A1 | 8/2014 | Kim et al. |
| 2014/0287298 A1 | 9/2014 | Sumihiro |
| 2015/0118545 A1 | 4/2015 | Komatsu et al. |
| 2016/0079584 A1 | 3/2016 | Lee et al. |
| 2017/0062778 A1 | 3/2017 | Mille et al. |
| 2017/0279087 A1 | 9/2017 | Tsuda et al. |
| 2018/0219199 A1 | 8/2018 | Lee et al. |
| 2018/0301668 A1 | 10/2018 | Nicholls |
| 2019/0165411 A1 | 5/2019 | Tu et al. |
| 2020/0295330 A1 | 9/2020 | Armacanqui et al. |

\* cited by examiner

BATTERY HOUSING AND SYSTEMS AND METHODS OF MAKING THEREOF

CROSS-REFERENCE TO RELATED PATENT APPLICATIONS

This Application claims the benefit of and priority to U.S. Provisional Application No. 63/009,562 filed on Apr. 14, 2020, the entire disclosure of which is hereby incorporated by reference herein.

FIELD

The present technology relates generally to batteries. More particularly, the technology relates to rechargeable button cell batteries.

BACKGROUND

The presence of entrapped gas within an assembled battery is undesirable for a number of reasons. For example, contamination in and/or moisture carried by trapped gas may cause unintended side reactions in the cell. Gas trapped within the battery interior also decreases the volume available to accommodate evolved gasses, and increases the pressure within the battery interior, thus increasing the risk of leakage and decreasing cell safety. Also, positive pressure (i.e. pressure in excess of ambient pressure) caused by trapped gas may interfere with the ability to weld components to the battery housing, and thus may lead to manufacturing inefficiencies. Given the sensitive chemistry of rechargeable button cell batteries (as compared, e.g., to primary button cell batteries or larger cell batteries), the effects of entrapped gas may be particularly undesirable during the assembly of rechargeable button cell batteries.

One option for mitigating problems associated with the entrapment of gas within the interior of a battery involves the assembly of a battery within an inert gas environment. By minimizing the risk of introducing contaminants and moisture, this option reduces the occurrence of certain undesired consequences associated with trapped gas (e.g., unintended side reactions in a cell). However, this option does not remedy the issues posed by the increased interior pressure within a battery resulting from the entrapment of inert gas during the assembly of the battery.

Another option for mitigating problems arising from the entrapment of gas involves the creation of a vacuum within the battery housing during the assembly process. However, this process is difficult, and often unsuccessful. Furthermore, even when the battery interior is successfully subject to a vacuum, the negative pressure within the battery interior (i.e. a pressure that is less than ambient pressure) may pose similar problems to those posed by the battery interior having a positive pressure. For example, batteries having an interior subject to a negative pressure may suffer from an increased risk of leakage, and the negative pressure may interfere with the ability to weld components to the battery housing, etc.

SUMMARY

In one implementation of the present disclosure, a housing for a button cell battery includes a grommet and a can. The grommet has a top panel and a skirt. The can has a top panel and a skirt. The skirt of the can extends between the top panel and a free end, and includes (e.g., is defined by) a substantially vertical first section and an outwardly tapered second section. The first section extends from the top panel of the can. The second section extends from the first section. A flow path between an outer surface of the skirt of the grommet and an inner surface of the skirt of the can is defined upon assembly of the grommet within the can. The flow path extends between the second section and the free end of the can. The flow path may be defined by a radial offset of the outer surface of the skirt from the inner surface of the skirt of the can.

The skirt of the can further optionally includes (e.g., is defined by) an outwardly tapered third section that extends between the second section and the free end. The skirt of the can extends at a first angle relative to an axis about which the can is centered in the second section and extends at a second angle relative to the axis in the third section. The first angle is different than the second angle. For example, the first angle is greater than the second angle.

In some embodiments, the third section includes (e.g., is defined by) a plurality of different transition sections. Each transition section is defined by a portion of the skirt that extends at an angle relative to the axis that is different than an angle relative to the axis at which an adjacent transition section extends. According to some embodiments, at least one of the transition sections is substantially vertical.

An inner diameter of the skirt of the can at the interface between the first section and second section is greater than an outer diameter of the top panel of the grommet. A skirt of the grommet is optionally outwardly tapered.

In one implementation of the present disclosure, can for a button cell battery include a top panel and a skirt. The skirt extends between a first end located adjacent the top panel and a free second end. The skirt includes (e.g., is defined by) a first section extending from the first end, a second section extending from the second end, and a third section extending between the first section and second section. The first section has a substantially uniform inner diameter. The second section extends at a first angle relative to an axis about which the can is centered. The third section extends at a second angle relative to the axis that is different than the first angle.

In some embodiments, a height of the can, as measured along the axis, is between approximately 3.6 mm and approximately 6.0 mm. An interface between the first section and second section may be located approximately 0.05 mm and approximately 0.40 mm from a lower surface of the top panel. An interface between the second section and third section is optionally located approximately 0.40 mm and approximately 0.80 mm from a lower surface of the top panel. According to some such embodiments, the can may be a component of a housing for a size 10, 13, size 312 or size 675 hearing-aid battery. According to other embodiments, the can may be a component of a housing for any other size battery, and may thus be defined having any other range of different heights.

The third section optionally includes (e.g., is defined by) a plurality of different transition sections. Each transition section is defined by a portion of the skirt that extends at an angle relative to the axis that is different than an angle relative to the axis at which an adjacent transition section extends. In some embodiments, at least one transition section is substantially vertical.

According to one implementation of the present disclosure, a method of assembling a button cell battery is described. A free end of a grommet is positioned over a free end of a top. A free end of a can is positioned over a top panel of the grommet. The can includes a skirt having a substantially vertical first section that extends from a top panel of the can, and an outwardly tapered second section that extends from the first section. An inner diameter of the skirt in the first section is substantially equal to an outer diameter of the top panel of the grommet.

A put-together arrangement defined following the positioning of the can over the grommet and the positioning of the grommet over the top is resized from a first, expanded configuration to a second, constrained configuration. Following the resizing of the put-together arrangement, an inner diameter of the skirt of the can in the second section is substantially equal to the inner diameter of the skirt in the first section.

In some embodiments, the resizing of the put-together arrangement includes supporting a top panel on the top on a platform provided at a center of a cylinder of a resize press. A free end of the can is supported on a base of a track formed along the upper surface of the cylinder. The base is vertically offset from the upper surface of the cylinder. The resize die of the resize press is lowered onto the put-together arrangement until a lower surface of the resize die contacts the upper surface of the cylinder.

Upon the lower surface of the resize die contacting the upper surface of the cylinder, a lower portion of the put-together arrangement is not contained within a bore defined by the resize die. The lower portion of the put-together arrangement is introduced into an interior of a bore of a constraining die. The bore has a tapered diameter that decreases in size between a first diameter defined at an open end of the bore and a second diameter defined within the interior of the bore. The first diameter of the bore is greater than a diameter of the lower portion of the put-together arrangement. The free end of the can is optionally sealed relative to the top panel of the top. The free end of the grommet is optionally sealed along the top panel of the top. The grommet extends between, and insulates, the can from the top. In some embodiments, an electrode tab electrically coupled to an electrode assembly positioned within the top may be laser welded to an inner surface of the can following the sealing of the free end of the can relative to the top panel of the top. The foregoing summary is illustrative only and is not intended to be in any way limiting. In addition to the illustrative aspects, embodiments and features described above, further aspects, embodiments and features will become apparent by reference to the following drawings and the detailed description.

DESCRIPTION OF DRAWINGS

FIGS. 11-14 representatively depict a method of assembling a put-together arrangement of a battery into an assembled battery, according to one embodiment, wherein

DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and may be practiced with any other embodiment(s).

Figure 1:
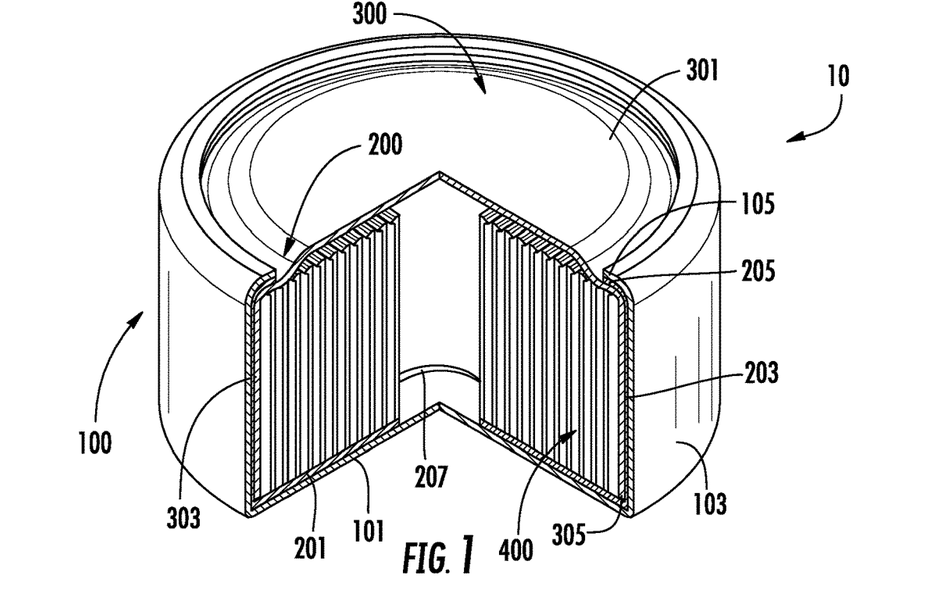
FIG. 1 illustrates a perspective, partial sectional view of an assembled button cell battery, according to one embodiment.

Referring to FIG. 1, a partial sectional view of an assembled button cell battery 10 is shown according to one representative embodiment. The battery 10 generally comprises a can 100, a grommet 200, a top 300, and an electrode assembly 400. The can 100, grommet 200, and top 300 each include (e.g., are defined by) a top panel 101, 201, and 301, respectively, as well as a skirt 103, 203, and 303, respectively.

As shown in FIG. 1, in the assembled configuration of the battery 10, the can 100, grommet 200, and top 300 define a sealed housing having a cavity within which the electrode assembly 400 is contained. The electrode assembly 400 is electrically coupled to the housing such that the top 300 and the can 100 each form one pole (e.g. anode or cathode) of the battery 10. For example, the top panel 201 of the grommet 200 is optionally provided with an opening (e.g., a central hole 207) via which a weld tab or other structure (not shown) extends to electrically couple one of the anode and cathode of the electrode assembly 400 to an inner surface of the can 100 (e.g., a lower surface of the top panel 101). Alternatively, other structures and/or electrode configurations may be used to electrically couple the anode and cathode of the electrode assembly 400 to one of the top 300 and can 100.

During an initial phase of the assembly of the battery 10, the top 300 is inverted (i.e., positioned such that the top panel 301 of the top 300 is located below the skirt 303), and the electrode assembly 400 is positioned within a cavity defined by the top 300. One or more additional processes related to the incorporation of the electrode assembly 400 with the top 300 (e.g., the welding of an electrode tab to an interior surface of the top 300, filling the cavity of the top 300 with electrolyte solution, etc.) may optionally also be performed during the initial assembly phase.

Figure 2:
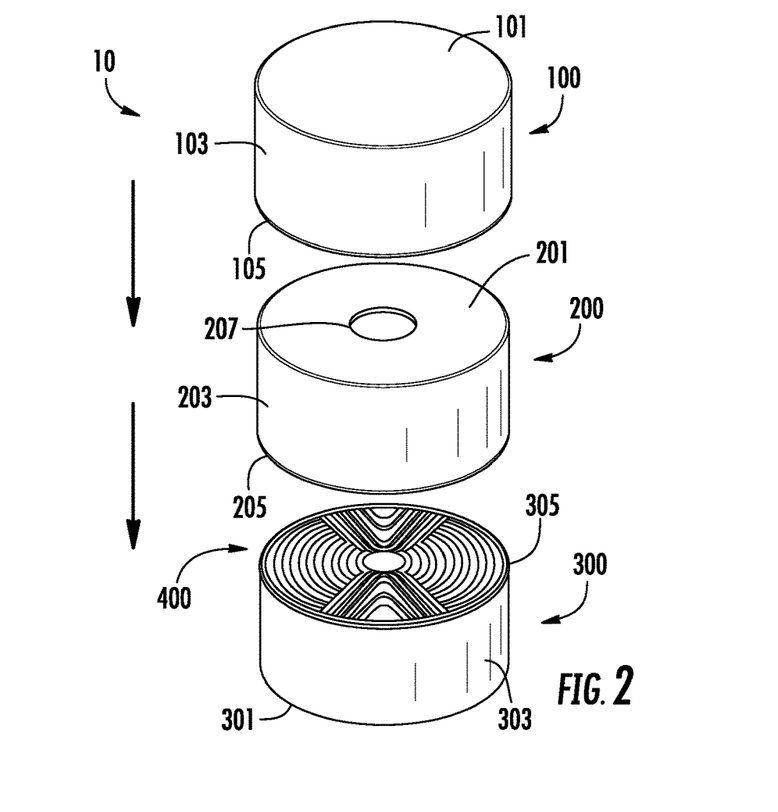
FIG. 2 is a diagram representative of a put-together phase in the assembly of a button cell battery.

As representatively illustrated by the arrows in the diagram of FIG. 2, during a put-together phase in the assembly of the battery 10, the free end 105 of the can 100 is placed over the top panel 201 of the grommet 200. The grommet 200 and the can 100 are then moved relative to one another until the grommet 200 has been received within the can 100

Figure 4A:
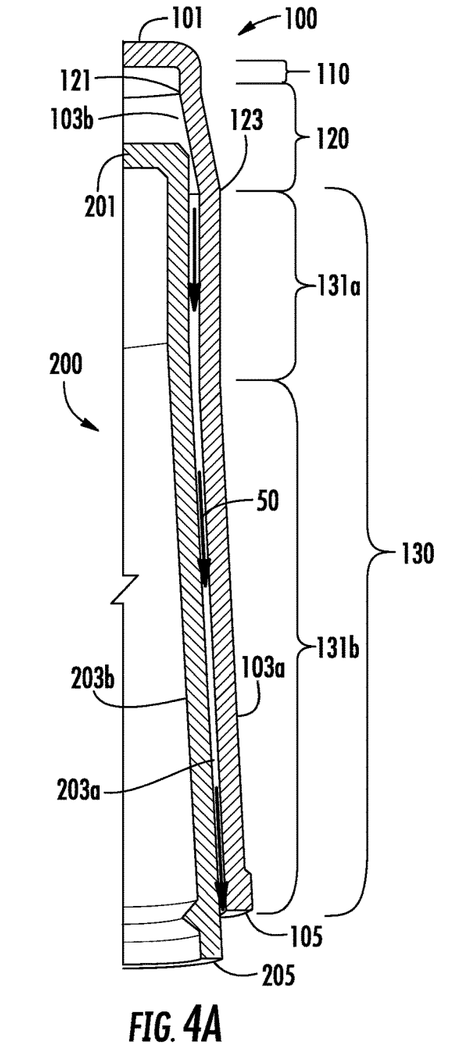
FIG. 4A illustrates a partial cross-sectional view of a put-together arrangement of a can and grommet, according to one embodiment.
Figure 4B:
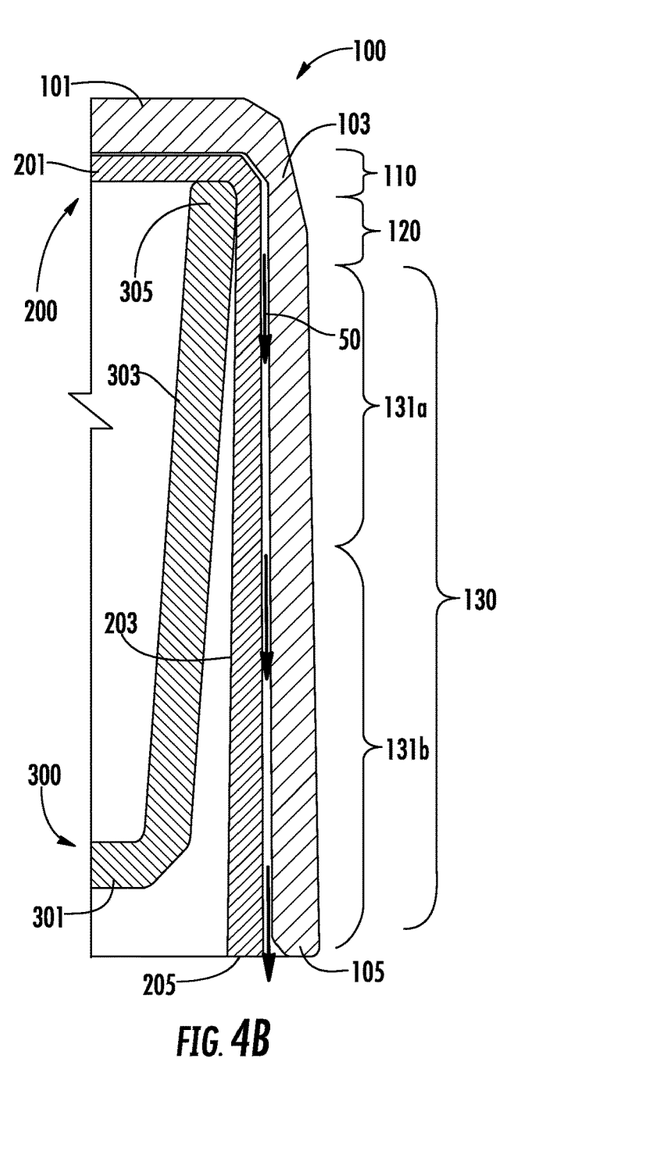
FIG. 4B illustrates a partial cross-sectional view of a put-together arrangement of a can, grommet and top, according to one embodiment.
Figure 5:
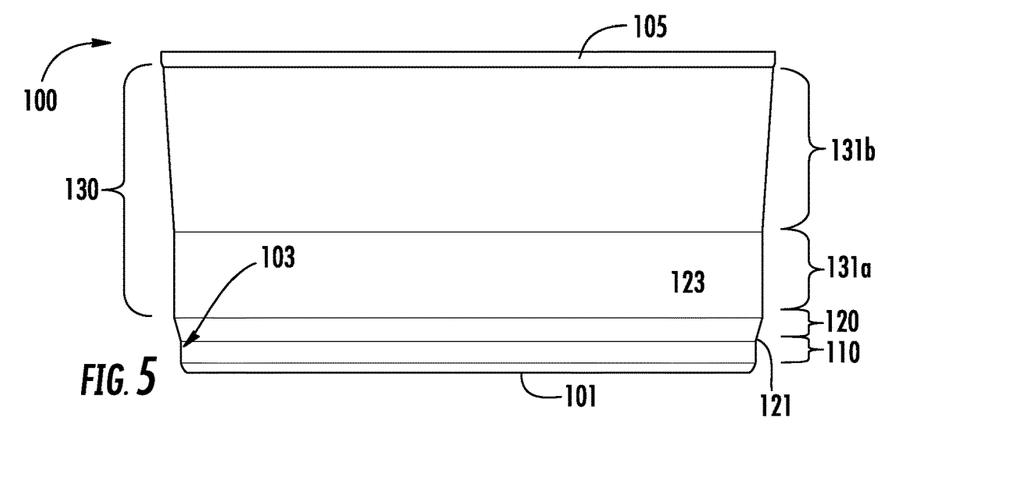
FIG. 5 illustrates a can, the enlarged portion of FIG. 5 providing a detailed view of the transition between the accommodation section, expanded section and main body section of the can, according to one embodiment.
Figure 6:
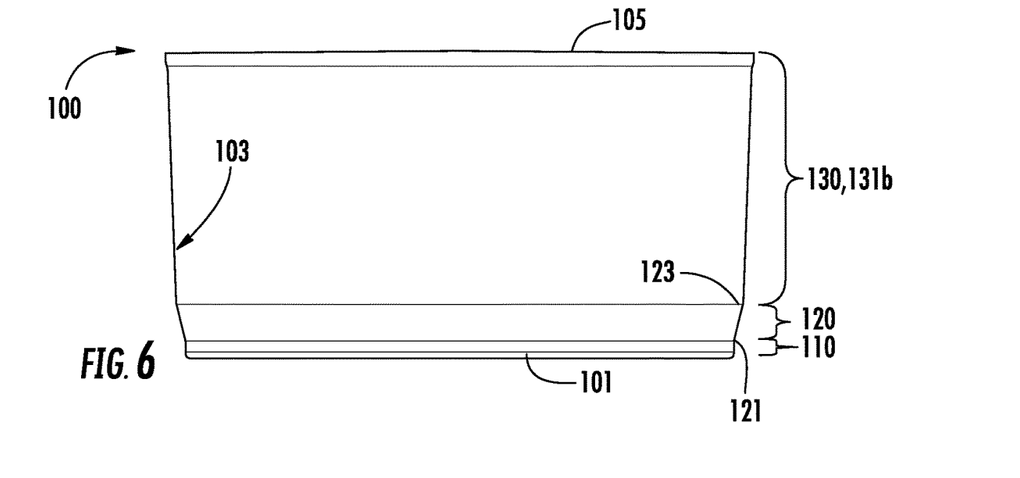
FIGS. 6-8 illustrate a can, according to various embodiments.
Figure 7:
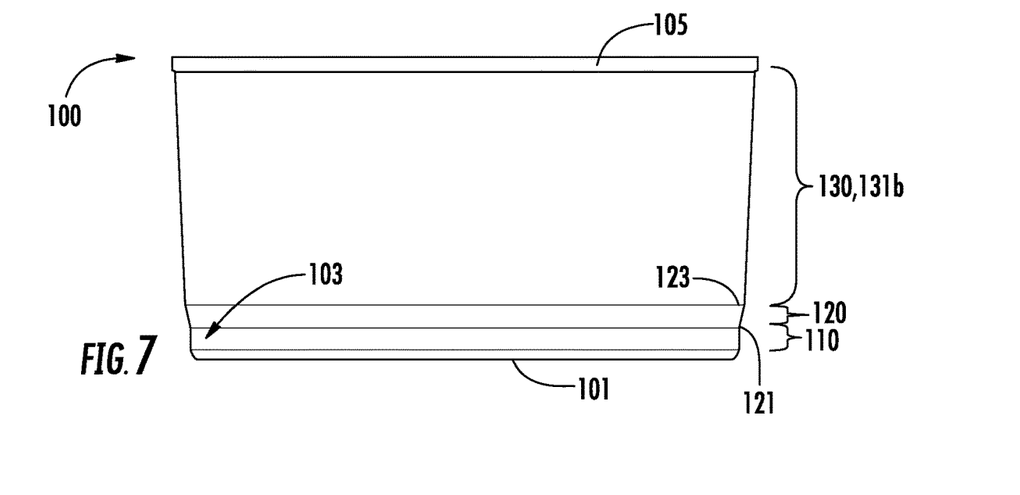
Figure 8:
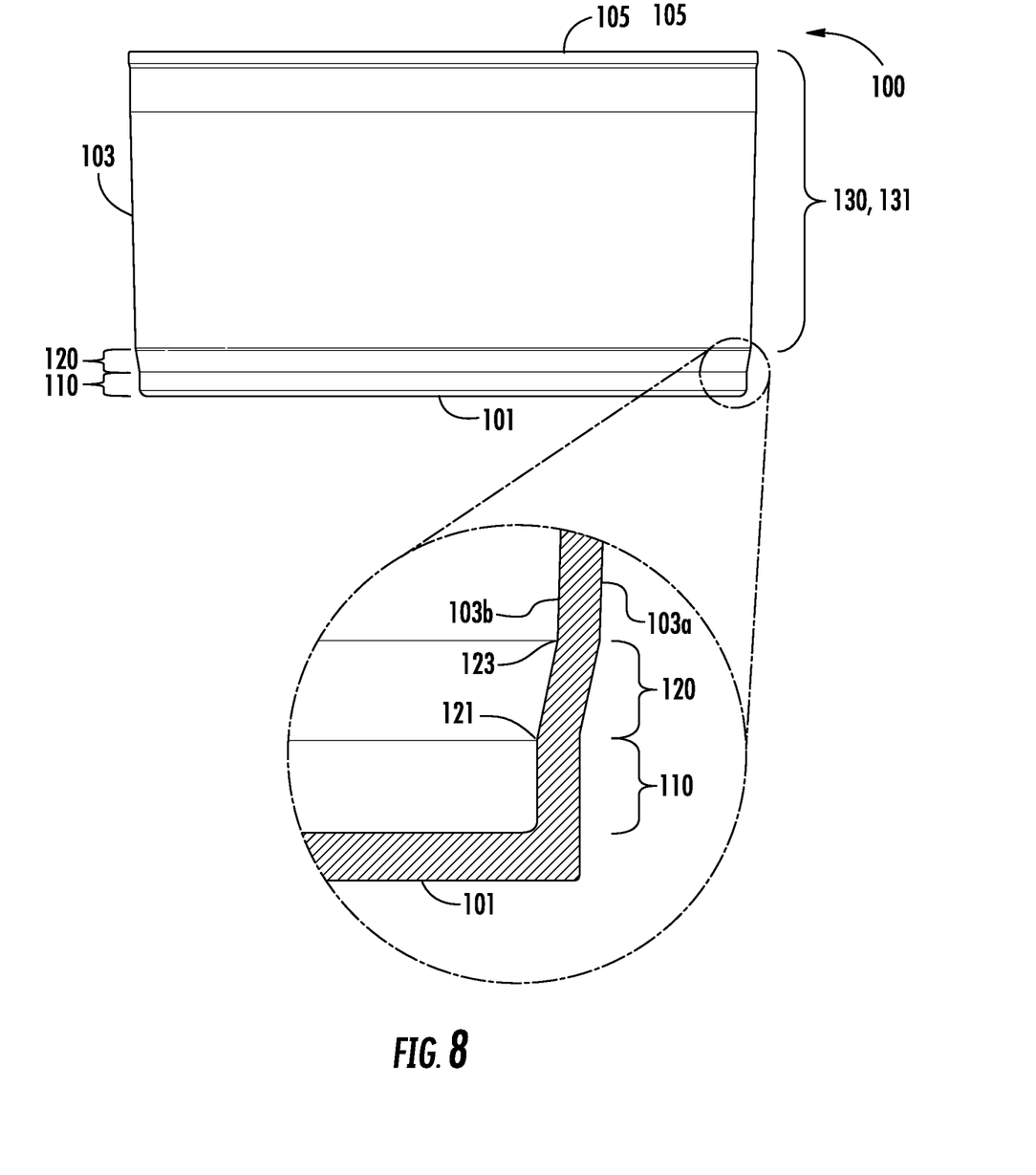

(such as, e.g., representatively shown in FIG. 4B). This nested arrangement of the can 100, grommet 200, top 300 and electrode assembly 400 formed upon completion of the put-together assembly phase defines a put-together arrangement of the battery 10.

Following the put-together assembly phase, the free end 105 of the can 100—and optionally the free end 205 of the grommet 200—is sealed (e.g., crimped) relative to the top panel 301 of the top 300 to define a sealed arrangement of the battery 10. The sealed battery 10 is then optionally subject to one or additional processes (e.g. the laser welding of an electrode tab to an interior surface of the can 100) to finalize the assembly of the battery 10.

Referring generally to FIGS. 3-10, can and grommet features that define a flow path via which gas may escape during the assembly of a battery are shown and described according to various embodiments. As discussed in more detail below, the can and grommet features, according to any of the embodiments described herein, advantageously minimize (e.g. prevent) the entrapment of gas—and resultant increased pressure—within the interior of an assembled battery. Not only are the can and grommet features described herein advantageously able to achieve a neutral pressure (i.e. a pressure substantially equal to ambient pressure during assembly of the battery) within the interior of the assembled battery, but they are able to do so without relying on the application of a vacuum to the interior of the battery during assembly.

Figure 3:
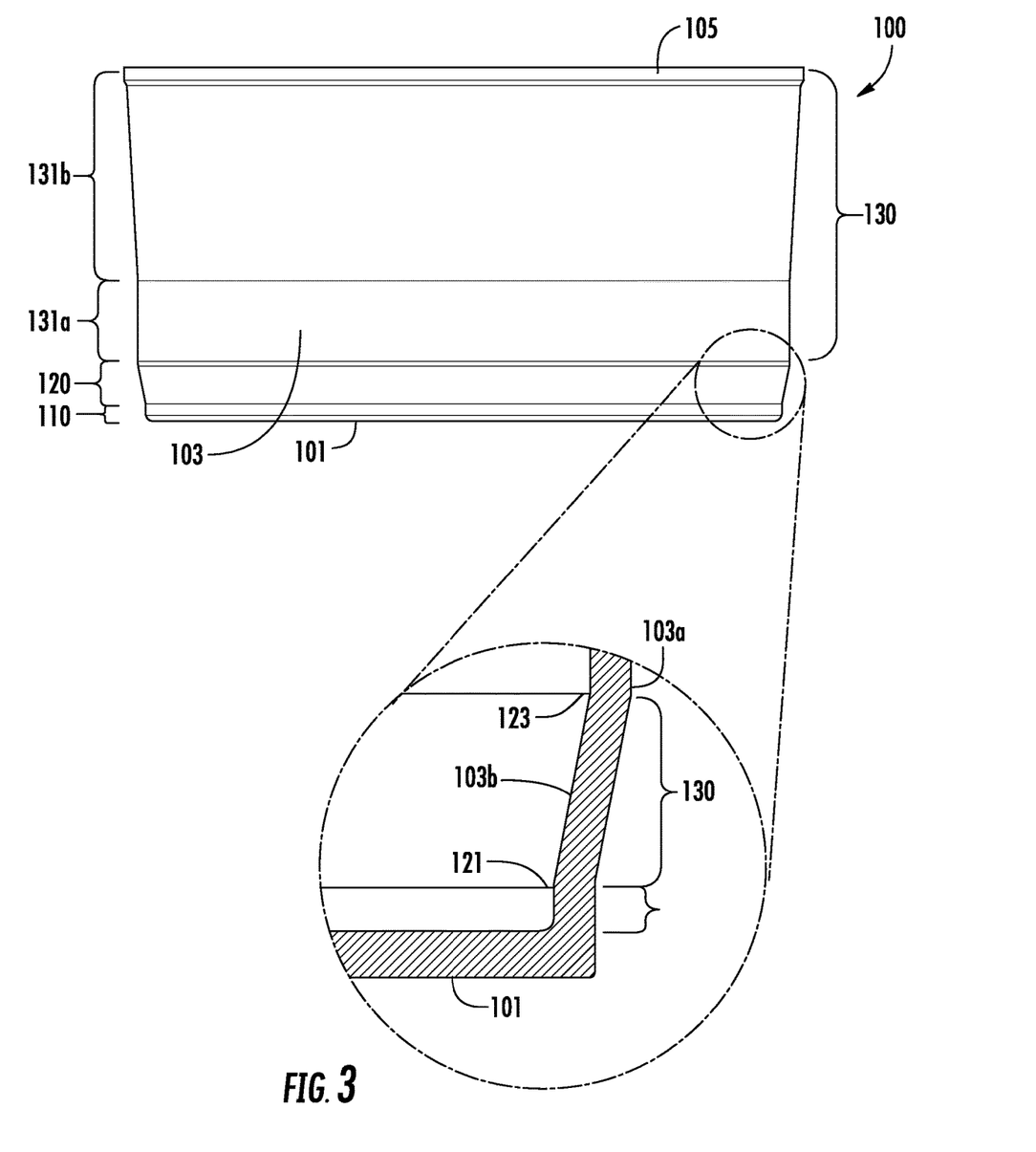
FIG. 3 illustrates a can, the enlarged portion of FIG. 3 providing a detailed view of the transition between the accommodation section, expanded section and main body section of the can, according to one embodiment.

Turning to FIG. 3, a can 100 having a flow path-defining configuration is shown according to one example embodiment. As representatively illustrated by the can 100 of FIG. 3, the flow path-defining can 100 configuration generally includes an skirt 103 having an accommodation section 110 that axially aligns the can 100 and grommet 200 relative to one another, and an expanded section 120 and main body section 130 that radially offset the skirt 103 of the can 100 from the skirt 203 of the grommet 200 to provide a continuous flow path 50 (see FIGS. 4A and 4B) via which gas may escape during the assembly of the put-together arrangement.

As shown in FIG. 3, the portion of the skirt 103 of the can 100 defining the accommodation section 110 extends substantially perpendicular (i.e. extends substantially vertically) relative to the top panel 101 of the can 100, and has a substantially uniform diameter along its height. An inner diameter of the portion of the skirt 103 defining the accommodation section 110 is dimensioned substantially equal to the outer diameter of the top panel 201 of the grommet 200. This dimensioning of the accommodation section 110 relative to the grommet 200 helps align a central axis of the grommet 200 with a central axis of the can 100 during the arrangement of the grommet 200 within the can 100. By thus facilitating a centered arrangement of the grommet 200 and can 100, the accommodation section 110 advantageously minimizes the risk of a non-symmetrical arrangement of the grommet 200 and can 100 that could compromise the ability of the can 100 and top 300 to be sealingly closed during subsequent stages in the assembly of the battery 10. Given the pliable (e.g., elastomeric) construction of the grommet 200, the accommodation section 110 may optionally be formed having an inner diameter that is equal to, or less than, the outer diameter of the top panel 201 of the grommet 200 (i.e., such that the grommet 200 is radially compressed as it is inserted into the can 100), thereby further reducing the risk of a non-centered arrangement of the grommet 200 and can 100.

The height of the accommodation section 110 may vary according to different embodiments. In general, the height of the accommodation section 110 is selected to be sufficiently large, so as to achieve a desired centering of the grommet 200 and can 100 relative to one another. However, it may also be desirable to limit the height of the accommodation section 110, so as to minimize a distance between the expanded section 120 and the top panel 101 of the can 100. Notably, locating the expanded section 120 closer to the top panel 101 may increase the degree to which a flow path 50 defined between the can 100 and grommet 200 extends relative to a height of the can 100 as the grommet 200 is arranged within the can 100. The increased length of the flow path 50 provided by minimizing a height of the accommodation section 110 (and thereby locating the expanded section 120 closer to the top panel 101) may advantageously minimize the risk of gas being entrapped within the put-together arrangement during the put-together phase in the assembly of the battery 10.

According to various embodiments, the accommodation section 110 may be defined having a height of between approximately 0.05 mm and approximately 0.50 mm, more particularly between approximately 0.01 mm and approximately 0.40 mm, and more particularly approximately between 0.20 mm and approximately 0.30 mm. In various embodiments, the battery 10 may be a size 13 or a size 312 hearing-aid battery. In such embodiments, the accommodation section 110 may be defined having an inner diameter of between approximately 7.00 mm and approximately 8.00 mm, more particularly between approximately 7.30 mm and 7.70 mm, and more particularly between approximately 7.50 mm and approximately 7.60 mm. According to other embodiments, the battery 10 may be a size 10 hearing-aid battery. In such embodiments, the accommodation section 110 may be defined having an inner diameter of between approximately 5.00 mm and approximately 6.00 mm, more particularly between approximately 5.20 mm and 5.80 mm, and more particularly between approximately 5.40 mm and approximately 5.50 mm. In yet other embodiments, the battery 10 may be a size 675 hearing-aid battery. In such embodiments, the accommodation section 110 may be defined having an inner diameter of between approximately 10.80 mm and approximately 11.80 mm, more particularly between approximately 11.00 mm and 11.60 mm, and more particularly between approximately 11.20 mm and approximately 11.30 mm. According to yet other embodiments, the battery 10 may be any other type of battery, and the diameter of the accommodation section 110 may be defined having any range of different widths.

As shown in FIG. 3, the expanded section 120 is defined by a portion the skirt 103 of the can 100 that extends between the accommodation section 110 and the main body section 130. The portion of the skirt 103 defining the expanded section 120 increases in diameter in a direction between a first end 121 of the expanded section 120 (defined at the interface between the expanded section 120 and the accommodation section 110) and a second end 123 of the expanded section 120 (defined at the interface between the expanded section 120 and the main body section 130).

The first end 121 of the expanded section 120 has a diameter equal to the diameter of the accommodation section 110. The second end 123 of the expanded section 120 is defined by an inner diameter that is greater than an outer diameter of the top panel 201 of the grommet 200. As shown in FIGS. 4A and 49, the relatively larger inner diameter of skirt 103 defined at the second end 123 (as compared to the outer dimeter of the top panel 201 of the grommet 200)

provides a radial offset between an exterior surface of the grommet 200 and the interior surface of the can 100 via which trapped gas may escape—even as the top panel 201 of the grommet 200 nears the top panel 101 of the can 100 during the arrangement of the grommet 200 within the can 100.

The expanded section 120 may be defined by a range of heights and degrees of tapering. In general, increasing the degree of tapering defining the expanded section 120, and maximizing the inner diameter of the second end 123 of the expanded section 120 may each help minimize the risk of entrapping gas during the put-together assembly phase. Notably, minimizing the height of the expanded section 120 of the can 100 results in the second end 123 of the expanded section 120 of the can 100 being located closer to the top panel 101 of the can 100, which in turn allows the expanded section 120 to provide a radial offset between the grommet 200 and can 100 even as the top panel 201 of the grommet 200 nears the top panel 101 of the can 100. Meanwhile, maximizing the inner diameter of the second end 123 of the expanded section 120 increases the radial offset between the inner surface 103b of the skirt 103 of the can 100 and the outer surface 203a of the skirt 203 of the grommet 200 as the grommet 200 is inserted into the can 100, and thereby advantageously minimizes the risk of an obstruction to the egress of gas from the interior of the put-together arrangement.

However, increasing the degree of outward tapering of the expanded section 120 may increase stress and strain on the can 100 during the resizing phase in the assembly of the battery 10 (described in more detail with reference to FIG. 11 below), and thus may increase the risk of deformation of the can 100 during the assembly of the battery 10. Minimizing a height of the expanded section 120 may similarly lead to an increase in the risk of deformation of the can 100, as reducing the height of the expanded section 120 requires a corresponding increase in the degree of outward tapering to provide a second end 123 defined by a predetermined, desired inner diameter. Thus, decreasing the height of the expanded section 120 may similarly lead to an increase in the risk of deformation of the can 100 during subsequent steps in the assembly of the battery 10. Accordingly, the selection of the height and the degree of tapering that define the expanded section 120 may also vary based on considerations such as, e.g., the materials used for the construction of the can 100, the chemical sensitivity of the electrode assembly 400, the types of additional assembly phases to which the put-together arrangement may be subject (e.g., welding, etc.), etc.

According to some embodiments, the height of the expanded section 120 may be between approximately 0.1 mm and approximately 1.0 mm, more particularly between approximately 0.15 mm and approximately 0.8 mm, and more particularly between approximately 0.2 mm and approximately 0.6 mm. A degree of tapering of the expanded section 120 may be defined by an angle of between approximately 0 degrees and approximately 25 degrees, more particularly between approximately 5 degrees and approximately 15 degrees, and more particularly between approximately 9 degrees and approximately 13 degrees. For example, according to one example embodiment, the expanded section 120 has a height of 0.25 mm and has a degree of tapering of 13 degrees. According to another example embodiment, the expanded section 120 has a height of 0.51 mm and has a degree of tapering of 9 degrees. In yet another example embodiment, expanded section 120 has a height of 0.51 mm and has a degree of tapering of 11 degrees.

Referring again to FIG. 3, the portion of the skirt 103 of the can 100 that defines main body section 130 corresponds to a portion of the skirt 103 extending between the expanded section 120 and the free end 105 of the can 100. The main body section 130 is defined along its height by one or more transition portions 131. Each transition portion 131 is defined by a height and a degree of tapering (i.e. angle at which the transition portion 131 extends relative to the central axis of the can 100). An inner diameter of a transition portion 131 may be constant (i.e., may define a vertical transition portion 131a), or may vary along the height of the transition portion 131 (i.e., may define an outwardly tapered transition portion 131b). As illustrated by the various can 100 embodiments shown in FIGS. 3-8, the number of transition portion(s) 131 that define the main body section 130—as well as the heights and degree of tapering defining each of the transition portion(s) 131 of the main body section 130—may vary according to different embodiments.

The heights and degrees of tapering defining each of the one or more transition portions 131 are selected such that the main body section 130 is able to provide a continuous, radial offset between the inner surface 103b of the skirt 103 of the can 100 and the outer surface 203a of the skirt 203 of the grommet 200 as the grommet 200 is positioned within the can 100. Accordingly, an inner diameter of the free end 105 of the can 100 is greater than a largest outer diameter of the grommet 200.

The configuration of the expanded section 120 and main body section 130 (i.e., the number of transition portions 131 defining the main body section 130, the height and degree of tapering defining the transition portions 131 and expanded section 120, etc.) may be based on the configuration of the exterior of the skirt 203 of the grommet 200. For example, in embodiments in which the grommet 200 comprises a substantially vertical skirt 203, the main body section 130 may optionally comprise a single transition portion 131 that is a substantially vertical transition portion 131a, such as, e.g., representatively illustrated by the can 100 of FIG. 5. In other embodiments, the grommet 200 may be outwardly tapered (e.g., to facilitate the placement of the grommet 200 onto the top). Accordingly, as illustrated in FIGS. 3-4B and 6-8, the main body section 130 may optionally also comprise one or more tapered transition portions 131b that are optionally separated by vertical transition portions 131a.

In addition to, or as an alternative to, the flow path-defining can features described with respect to FIGS. 3-8, the grommet 200 may optionally also be defined by flow path-defining features via which gas may escape during assembly of the battery 10. For example, as representatively illustrated by FIGS. 9A-10, one or more discontinuities 220 may be formed along the annularly extending wall that defines skirt 203 of the grommet 200. During the insertion of the grommet 200 into the can 100, the discontinuities 220 along the skirt 203 of the grommet 200 define channels between the outer surface 203a of the grommet 200 and the inner surface 103b of the skirt 103 of the can 100 that provide a flow path 50 via which gas may escape.

Figure 9A:
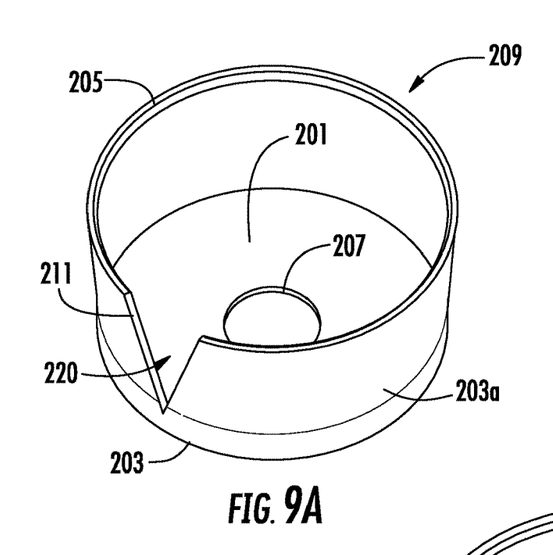
FIGS. 9A and 9B illustrate a grommet, according to one embodiment.
Figure 9B:
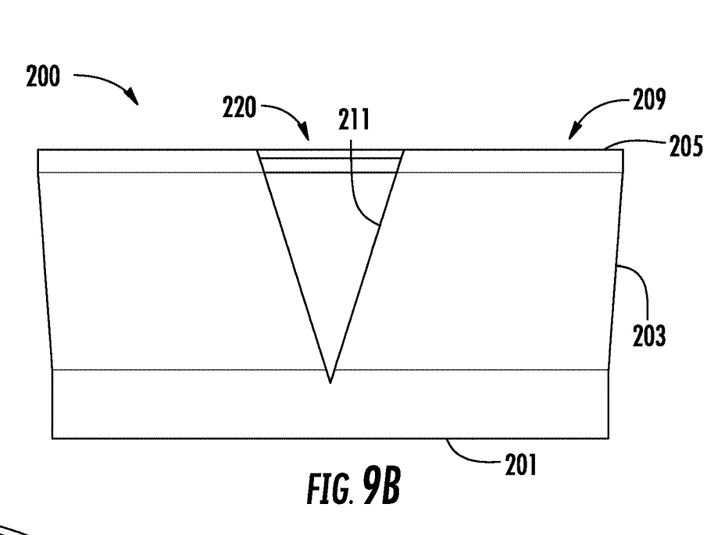
Figure 10:
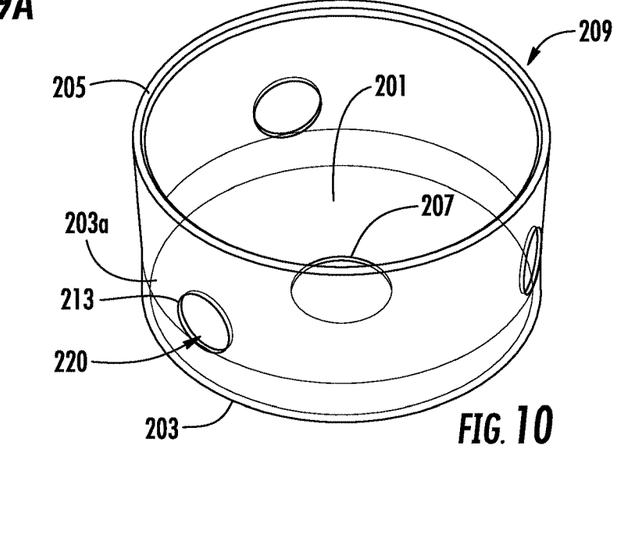
FIG. 10 illustrates a grommet, according to one embodiment.

As representatively illustrated by the triangle-shaped segment 211 cut from the skirt 203 of the grommet 200 embodiment of FIGS. 9A and 9B, the discontinuities 220 are optionally defined along the lower edge 209 of the grommet 200. The discontinuities 220 may optionally also be formed along a portion of the annular wall defining the skirt 203, such as, e.g., the holes 213 formed through the skirt 203 of the grommet 200 embodiment of FIG. 10. Although the discontinuities 220 of the grommet 200 embodiments of FIGS. 9A-10 are shown as extending entirely through the skirt 203 (i.e. the discontinuities 220 are formed through each of the inner surface 203b and outer surface 203a of the skirt 203), the discontinuities 220 may alternatively be formed along only an outer surface 203a of the skirt 203 of the grommet 200 (e.g., the discontinuities 220 may be defined by debossed portions of the outer surface 203a of the skirt 203 of the grommet 200).

Referring to FIGS. 11-14, a system for, and method of, finalizing the assembly a of a put-together arrangement having a can 100 comprising flow path-defining features as described according to any embodiment herein into an assembled battery 10 (such as representatively illustrated by FIG. 1), is described according to one example embodiment. In general, the system includes a resize press 500 (see, e.g., FIG. 11), a pre-crimp press 600 (see, e.g., FIG. 12), a crimp press 700 (see, e.g., FIG. 13), and an eject press (see, e.g., FIG. 14).

Figure 11:
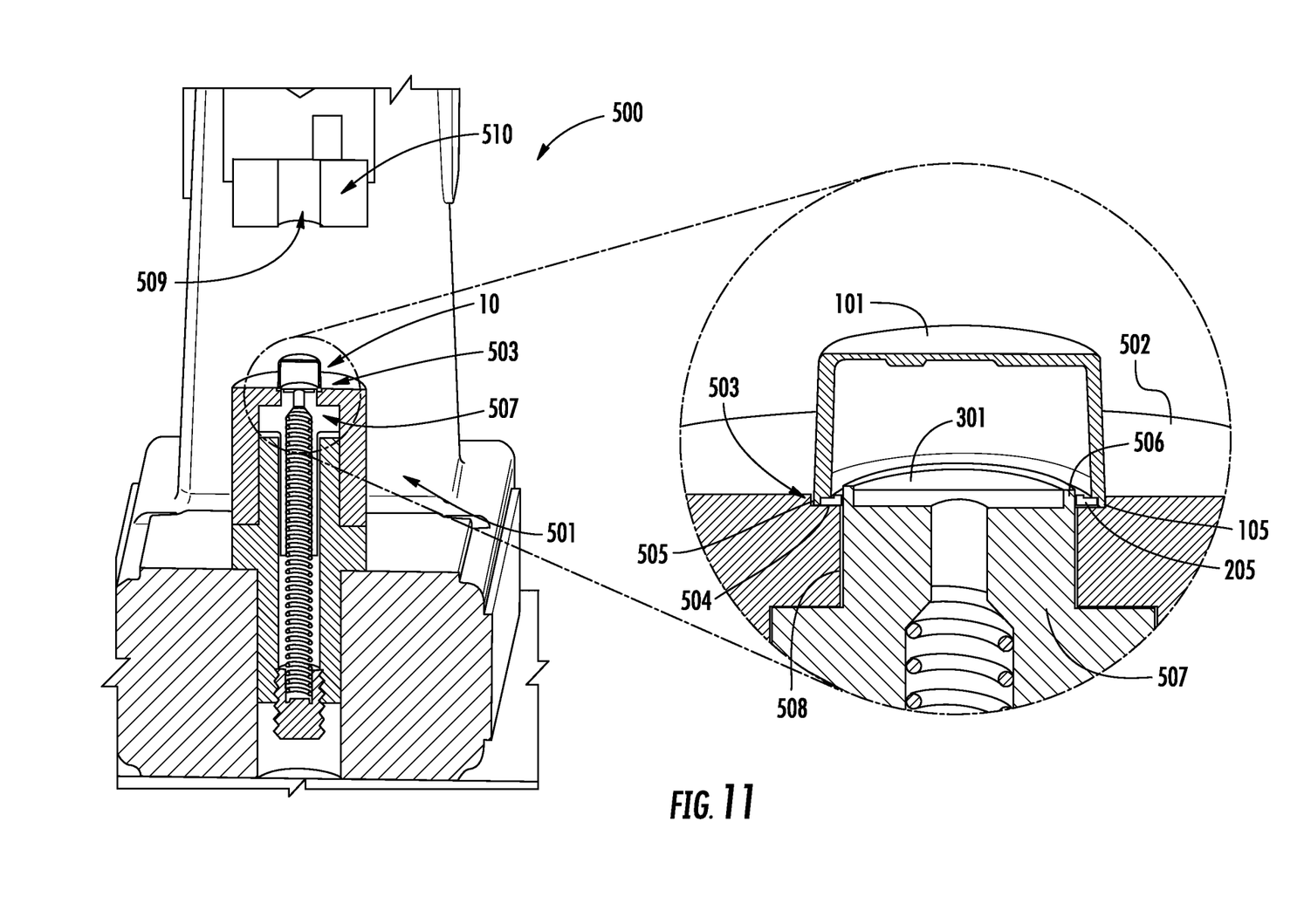
FIG. 11 illustrates a resize press according to one embodiment, the enlarged portion of FIG. 11 providing a detailed view of the resize press.

Referring to FIG. 11, the resize press 500 includes a cylinder 501 (e.g., a metal cylinder) having a flat upper surface 502. A stepped, grooved track 503 is formed in (e.g., defined by) the upper surface 502. The track 503 extends circumferentially about a central axis of the cylinder 501. As shown in FIG. 11, the track 503 includes a depressed, flat base 504 that is vertically offset from the flat upper surface 502. An outer vertical wall 505 (e.g., a step formed in the upper surface 502) connects the flat base 504 of the groove and the upper surface 502 of the cylinder 501.

A platform 506 is located within, and extends upwards relative to, an inner perimeter of the track 503. As representatively illustrated in FIG. 11, the platform 506 is optionally defined by an upper surface of a pin 507 (e.g., a non-conductive pin) that is supported within an opening 508 formed through a center of the upper surface 502. An outer surface of the pin 507 defines an inner vertical wall that extends between the flat base 504 of the track 503 and the platform 506. Alternatively, the platform 506 is defined by the upper surface 502 of the cylinder 501, with the inner vertical wall being defined by a step formed in the upper surface 502 at a location surrounding an inner perimeter of the track 503.

During the resize phase of the assembly of the battery 10, the inverted top 300 of the put-together arrangement of the battery 10 is placed onto the platform in 506. As shown in FIG. 11, the free end 105 of the can 100 (and optionally the free end 205 of the grommet 200) extends past the top panel 301 of the inverted top 300, and is supported by the base 504 of the track 503. Once the put-together arrangement of the battery 10 has been positioned relative to the platform 506 and track 503, a resize die 510 supported by an upper portion of the resize press 500 is lowered onto the put-together arrangement of the battery 10, The resize die 510 defines a bore 509 having a diameter that corresponds to the desired final diameter of the assembled battery 10. Thus, as the resize die 510 is moved along the exterior of the put-together arrangement of the battery 10 in a downward direction, the resize die 510 compresses the outwardly tapered, enlarged diameter of the main body section 130 of the can 100 into a substantially vertical, resized configuration. As the resize die 510 is moved downwards relative to the put-together arrangement of the battery 10, the flow path 50 defined between the can 100 and grommet 200 advantageously facilitates the escape of air out from between the free ends 105, 205 of the can 100 and grommet 200, respectively.

During the resize phase, the outer vertical wall 505 prevents the free ends 105, 205 of the can 100 and grommet 200 from flaring outwards in response to the compressive force imparted by the downwards movement of the resize die 510 over the put-together arrangement. The resize die 510 is lowered relative to the put-together arrangement until a lower surface of the resize die 510 contacts the upper surface 502 of the cylinder 501. Because downwards movement of the resize die 510 terminates upon a lower surface of the resize die 510 reaching the upper surface 502 of the cylinder 501, the resize die 510 does not pass over the lower, expanded portions of the can 100 and grommet 200 that extend between the upper surface 502 of the cylinder 501 and the flat base 504 of the track 503. Accordingly, the lower expanded portions of the can 100 and grommet 200 are not resized into a reduced-diameter configuration during the resize phase.

Figure 12:
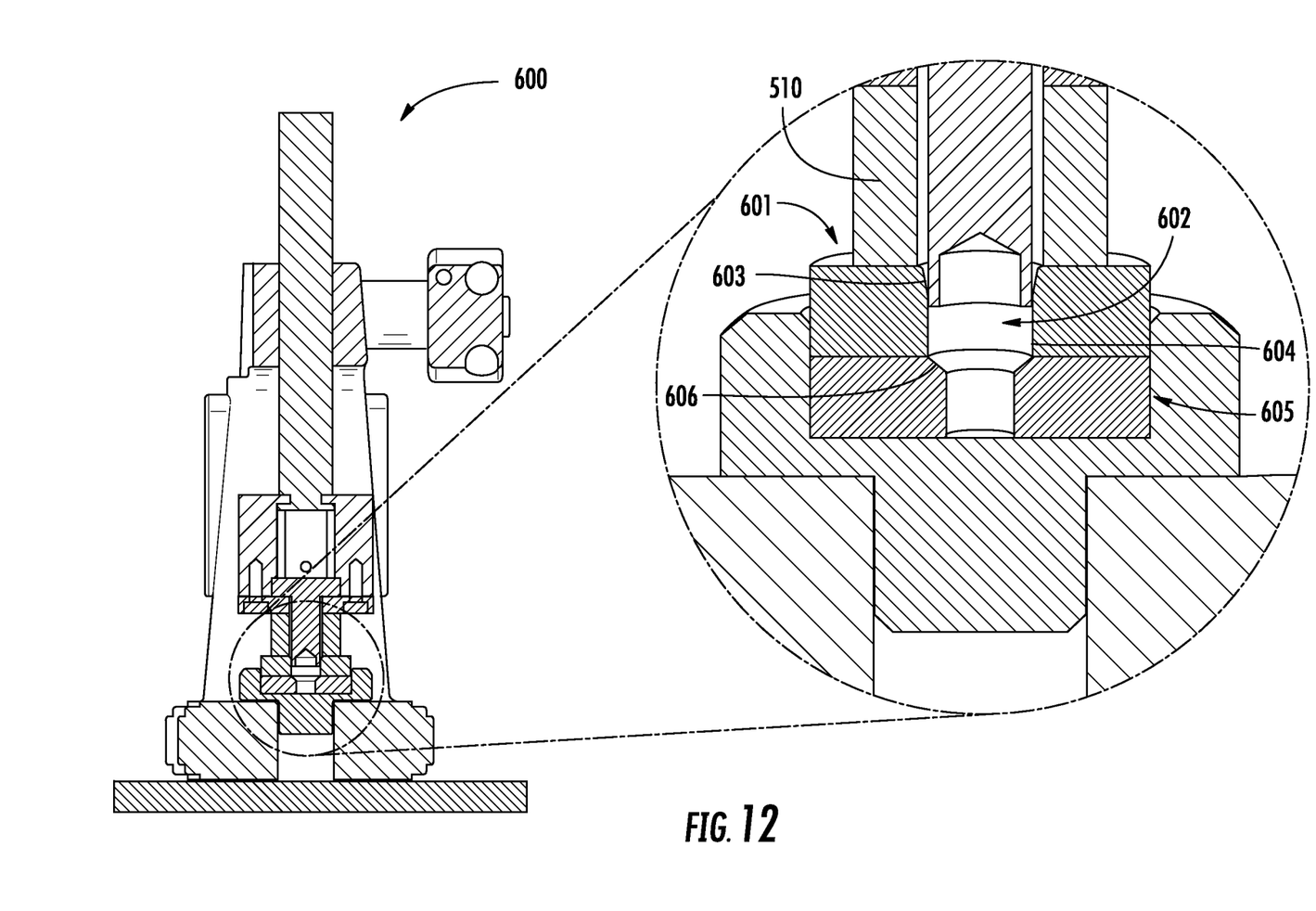
FIG. 12 illustrates a pre-crimp press, according to one embodiment, the enlarged portion of FIG. 12 providing a detailed view of the pre-crimp press.

During an initial stage of the pre-crimp phase, the lower, un-resized expanded portions of the can 100 and grommet 200 adjacent the free ends 105, 205 of the can 100 and grommet 200, respectively, are resized to match a diameter of the previously resized portion of the battery 10 (i.e., the lower expanded portions are resized to a dimension similar to the desired diameter of the assembled battery 10). During a secondary stage of the pre-crimp phase, the free ends 105, 205 of the can 100 and grommet 200, respectively, are curled inwards relative to the top panel 301 of the top 300.

As shown in FIG. 12, the resizing of the lower, un-resized expanded portions of the can 100 and grommet 200 during the pre-crimp phase is performed using a constraining die 601 of the pre-crimp press 600. The constraining die 601 includes a bore 602 that tapers inwardly from an enlarged first diameter 603 defined at an upper, open end of the bore 602 to a reduced-size second diameter 604. The enlarged first diameter 603 is dimensioned to accommodate the lower, un-resized expanded portions of grommet 200 and can 100. The diameter of the reduced-size second diameter 604 corresponds to the desired final diameter of the assembled battery 10.

Following the resize phase, the lower, un-resized portion of the battery 10 is positioned within and pushed into the open, upper end 603 of the constraining die 601 until it is received within the portion of the bore 602 defining the second diameter 604. The pre-crimp press 600 continues pushing the battery 10 through the constraining die 601 until the free ends 105, 205 of the can 100 and grommet 205, respectively, are brought into contact with an inwardly tapered surface 606 of a curling tool 605. This contact with the curling tool 605 causes the free ends 105, 205 of the can 100 and grommet 200, respectively, to be partially curled inwardly over the top panel 301 of the top 300. As the pre-crimp press 600 pushes the free ends 105, 205 into contact with the tapered surface 606 of the curling tool 605, the bore 602 of the constraining die 601 constrains the battery 10, so as to prevent the outer diameter of the battery 10 from being deformed (e.g., enlarged). Thus, the arrangement of the battery 10 defined upon completion of the pre-crimp phase has a generally uniform, vertical diameter.

Figure 13:
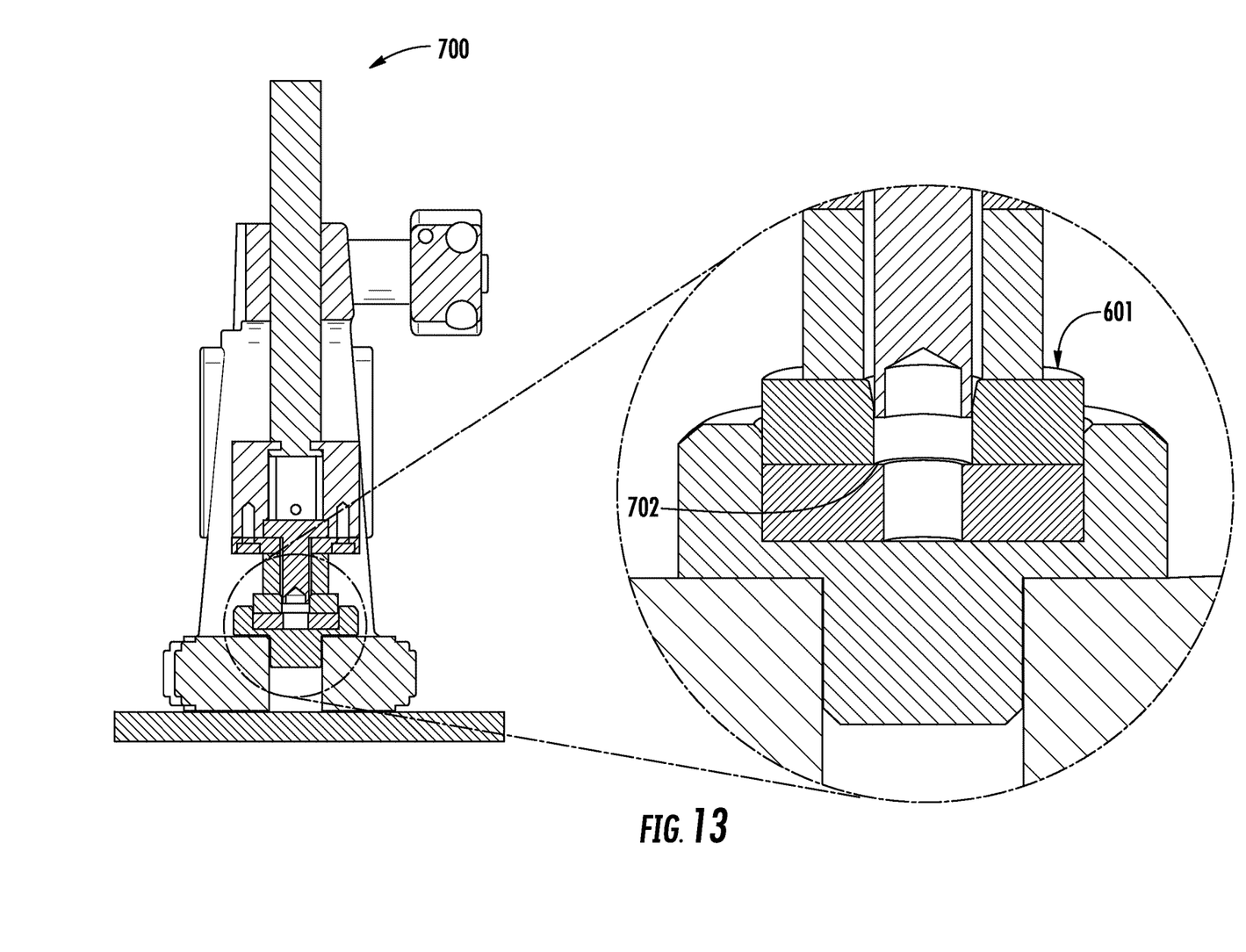
FIG. 13 illustrates a crimp press, according to one embodiment, the enlarged portion of FIG. 13 providing a detailed view of the crimp press.

As shown in FIG. 13, the constraining die 601(and the curled arrangement of the battery 10 received therein) is transferred to the crimp press 700 from the pre-crimp press 600 at the start of the crimping step. The free end 105 of the can 100 (and optionally the free end 205 of the grommet 200) is then pushed through the constraining die 601 against an upper surface 702 of the crimp press 700, thereby sealing the free ends 105, 205 relative to the top panel 301 of the top 300 to define a crimped, assembled arrangement of the button cell battery 10. The crimped, assembled arrangement of the button cell battery 10 continues to be pushed through the constraining die 601 until a desired height of the crimped, assembled arrangement of the button cell battery 10 is achieved.

Figure 14:
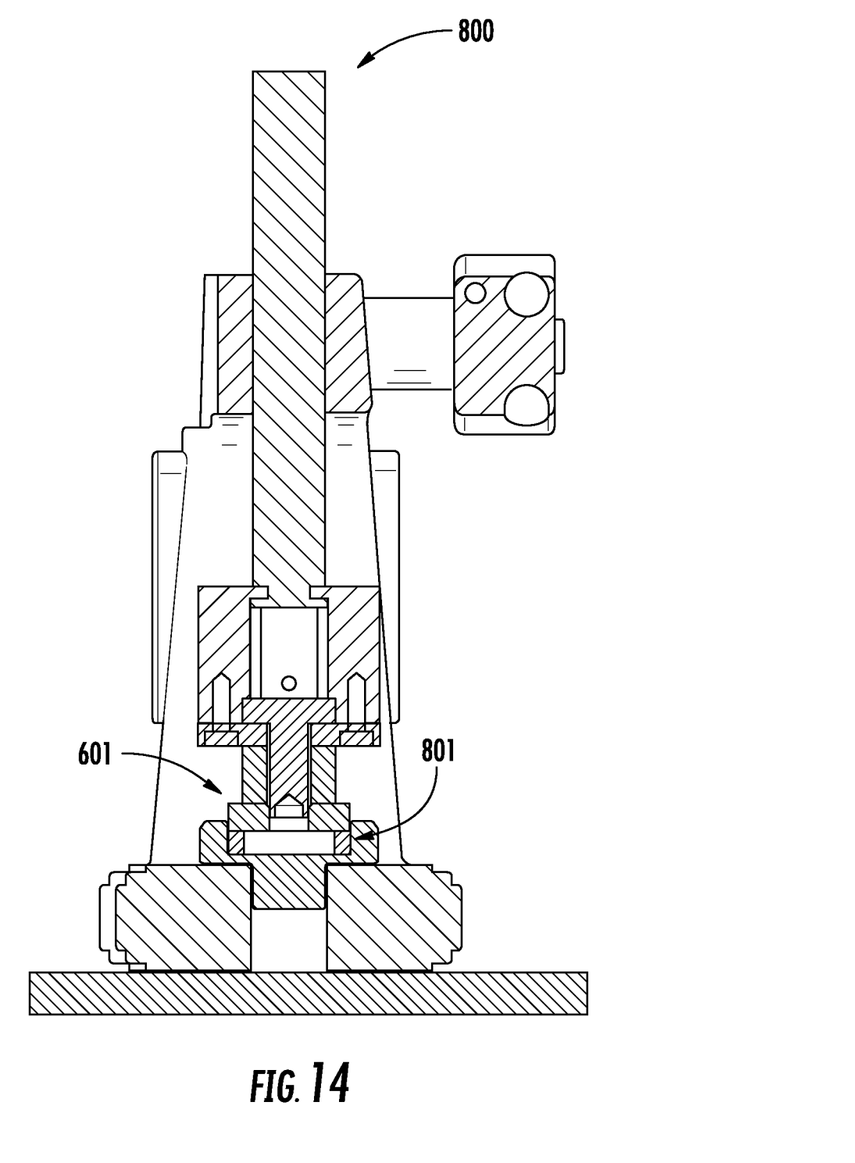
FIG. 14 illustrates an eject press, according to one embodiment.

From the crimp press 700, the constraining die 601 (and crimped, assembled arrangement of the button cell battery 10 received therein) is moved to the ejection press 800. At the ejection press 800, the constraining die 601 is pushed against an eject die 801, thereby releasing the assembled button cell battery 10.

Upon being ejected, the assembled button cell battery 10 may be subject to any number of additional optional steps to finalize the manufacture of the battery 10. For example, an electrode tab coupled to one of the anode and cathode of the electrode assembly 400 may be welded to an inner surface of the can 100 of the assembled battery 10. For example, in one example embodiment, a cathode tab that is coupled at a first end to a cathode layer of the electrode assembly 400, and which extends through the opening 207 of the grommet 200, is laser welded at its second end to a lower surface of the top panel 101 of the can 100.

As described above, the flow path 50-defining can 100 and/or grommet 200 used to form the assembled battery 10 described herein minimizes (e.g., prevent) the entrapment of gases within a cavity of the battery 10, such that the cavity of the battery 10 is advantageously subject to a neutral pressure (e.g. ambient pressure) following assembly. The welding of a tab to a closed battery 10 that is subject to a neutral interior pressure is more effective than the welding of a tab to a closed battery 10 that is subject to either a negative interior pressure (which may result in a melt pool occurring during welding being sucked into the battery 10) or a positive interior pressure (which may result in a melt pool occurring during welding being expelled from the battery 10). Accordingly, by improving the success rate of welding (e.g., laser welding) an electrode tab to an interior of the assembled battery 10, the systems and methods described herein advantageously increase the efficiency of the manufacture of button cell batteries 10.

As used herein, the terms "about" and "approximately" will be understood by persons of ordinary skill in the art and will vary to some extent depending upon the context in which they is used. If there are uses of these terms which are not clear to persons of ordinary skill in the art, given the context in which it is used, "about" and "approximately" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

While certain embodiments have been illustrated and described, it should be understood that changes and modifications may be made therein in accordance with ordinary skill in the art without departing from the technology in its broader aspects as defined in the following claims.

The embodiments, illustratively described herein, may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations may be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions, or biological systems, which can of course vary. It is also to be understood that the terminology used herein is for the purpose of describing particular embodiments only and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range may be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like, include the number recited and refer to ranges which may be subsequently broken down into subranges as discussed above. Finally, as will be understood by one skilled in the art, a range includes each individual member.

Other embodiments are set forth in the following claims.

What is claimed is:

1. A housing for a button cell battery, the housing comprising:

a grommet having a top panel and a skirt; and a can having a top panel and a skirt, the skirt extending between the top panel and a free end, and includes:
  a substantially vertical first section extending from the top panel of the can; and
  an outwardly tapered second section extending from the first section;
wherein a flow path between an outer surface of the skirt of the grommet and an inner surface of the skirt of the can extends between the second section of the skirt of the can and the free end of the can.

2. The housing of claim 1, wherein the flow path is defined by a radial offset of the outer surface of the skirt from the inner surface of the can.

3. The housing of claim 1, the skirt of the can further including an outwardly tapered third section that extends between the second section and the free end;
  wherein the skirt extends at a first angle relative to an axis about which the can is centered in the second section, and extends at a second angle relative to the axis in the third section, the first angle being different than the second angle.

4. The housing of claim 3, wherein the first angle is greater than the second angle.

5. The housing of claim 3, wherein the third section is defined by a plurality of different transition sections, each transition section being defined by a portion of the skirt that extends at an angle relative to the axis that is different than an angle relative to the axis at which an adjacent transition section extends.

6. The housing of claim 5, wherein at least one of the transition sections is substantially vertical.

7. The housing of claim 3, wherein an inner diameter of the skirt of the can at the interface between the first section and second section is greater than an outer diameter of the top panel of the grommet.

8. The housing of claim 1, wherein the skirt of the grommet is outwardly tapered.

* * * * *